(12) United States Patent
Breuer et al.

(10) Patent No.: US 7,768,241 B2
(45) Date of Patent: Aug. 3, 2010

(54) DEVICE FOR ADJUSTING THE IMPEDANCE OF A HIGH VOLTAGE LINE SUPPLYING AN ALTERNATING CURRENT

(75) Inventors: Wilfried Breuer, Erlangen (DE); Marcos Pereira, Erlangen (DE); Kadry Sadek, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 797 days.

(21) Appl. No.: 10/595,199

(22) PCT Filed: Sep. 1, 2004

(86) PCT No.: PCT/DE2004/001972
§ 371 (c)(1),
(2), (4) Date: Mar. 28, 2007

(87) PCT Pub. No.: WO2005/031487
PCT Pub. Date: Apr. 7, 2005

(65) Prior Publication Data
US 2007/0252574 A1    Nov. 1, 2007

(51) Int. Cl.
*G05F 1/70* (2006.01)
(52) U.S. Cl. .................. 323/208; 323/209; 323/235
(58) Field of Classification Search ............. 323/205, 323/206, 208, 209, 210, 235, 237, 240, 255, 323/290
See application file for complete search history.

(56) References Cited

U.S. PATENT DOCUMENTS

| | | | | |
|---|---|---|---|---|
| 4,151,427 A * | 4/1979 | Travin | ..................... | 327/451 |
| 4,434,376 A | 2/1984 | Hingorani | ..................... | 307/102 |
| 5,032,738 A | 7/1991 | Vithayathil | ..................... | 307/112 |
| 5,198,746 A | 3/1993 | Gyugyi et al. | ..................... | 323/207 |
| 5,399,955 A * | 3/1995 | Glaser et al. | ..................... | 323/208 |
| 6,274,851 B1 * | 8/2001 | Mulcahy et al. | ..................... | 219/501 |
| 6,275,851 B1 | 8/2001 | Cromer et al. | ..................... | 219/501 |

FOREIGN PATENT DOCUMENTS

| | | |
|---|---|---|
| DE | 37 873 35 T2 | 1/1994 |
| DE | 196 19 305 A1 | 11/1996 |
| DE | 197 33 516 A1 | 2/1999 |

(Continued)

OTHER PUBLICATIONS

Tyll, "FACTS Technology for Improved System Operation" Siemens AG (4 pages).

(Continued)

*Primary Examiner*—Jessica Han
(74) *Attorney, Agent, or Firm*—King & Spalding L.L.P.

(57) ABSTRACT

A device (8), for adjusting the impedance of a high voltage line (9), supplying an alternating current, has at least one control coil (2), which may be inserted in series in the high voltage line (9) and at least one switching device (3,10), provided for each control coil (2). The device is compact and economical. A control unit (4) for controlling each switching device (3,10) is also provided, such that the reactance of the control coil (2), acting in the device may be adjusted by the switching of the switching device (3,10), whereby each switching device (3,10) is arranged parallel to the corresponding control coil (2) in a parallel branch (5).

11 Claims, 16 Drawing Sheets

FOREIGN PATENT DOCUMENTS

| | | |
|---|---|---|
| EP | 0 258 314 B1 | 9/1993 |
| EP | 0 951 126 A1 | 10/1999 |
| WO | 96/39736 A1 | 5/1996 |

OTHER PUBLICATIONS

Bachmann et al. "Possibilities of Multifunctional FACTS Application in the European Electric Power System under the Changing Conditions of the Liberalized Electricity Market" (7 pages).

Christi et al. "Power System Studies and Modelling for the Kayenta 230 KV Substation Advanced Series Compensation" Siemens and Western Area Power Administration USA (pp. 33-37).

Gabrijel et al. "Direct Methods for Transient Stability Assessment in Power Systems Comprising Controllable Series Devices" IEEE Transactions on Power Systems (pp. 1116-1122), Nov. 2002.

Hedin et al. "SSR Performance of Advanced Series Compensation (ASC)"(7 pages).

International Search Report and Written Opinion for International Application No. PCT/DE2004/001972 (6 pages), Feb. 3, 2005.

German Office Action for German Patent Application No. 103 45 020.3 (4 pages), May 8, 2007.

Translation of Article "Dynamische Wirk-und Blindleistung für höhere Übertragungsleistung", ETZ Elektrotechnische Zeitschrift 111, Nr. 4; pp. 12, 1990.

Chinese Office Action for Chinese Patent Application No. 200480027534.8 (7 pages), Mar. 28, 2008.

* cited by examiner

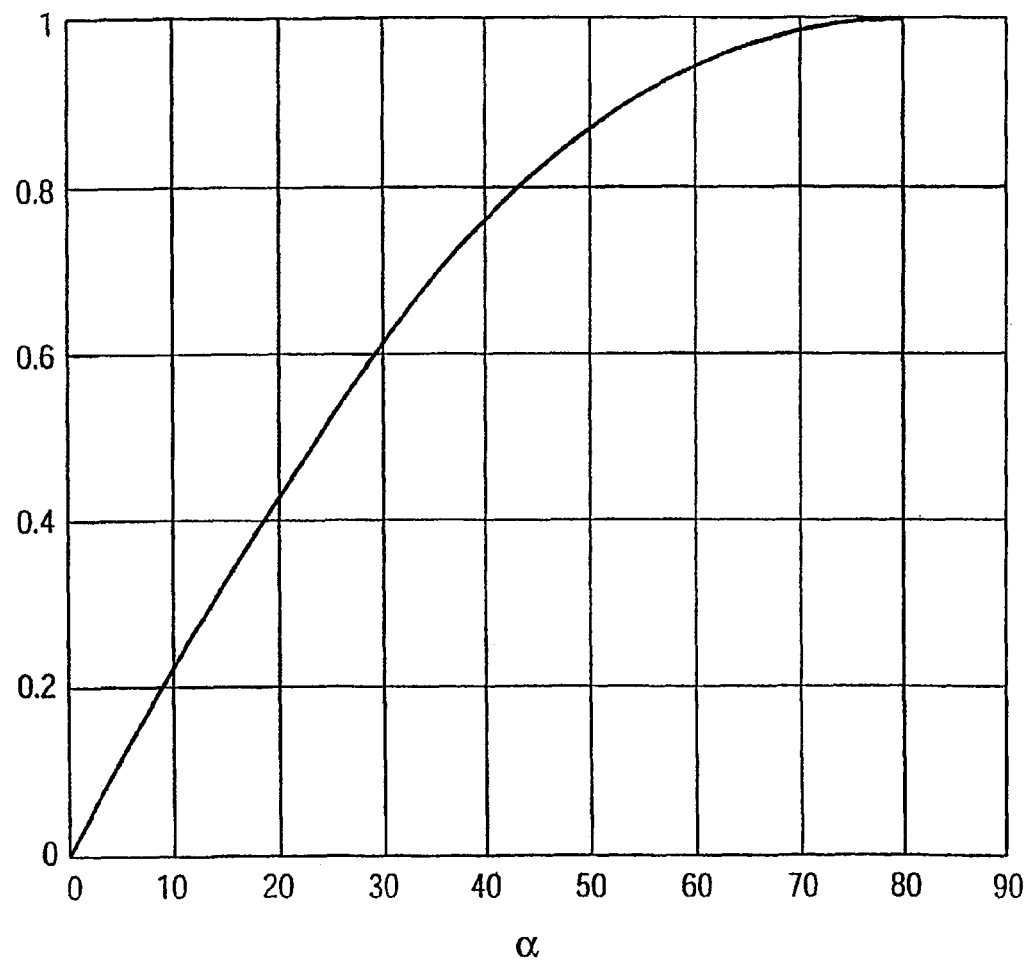

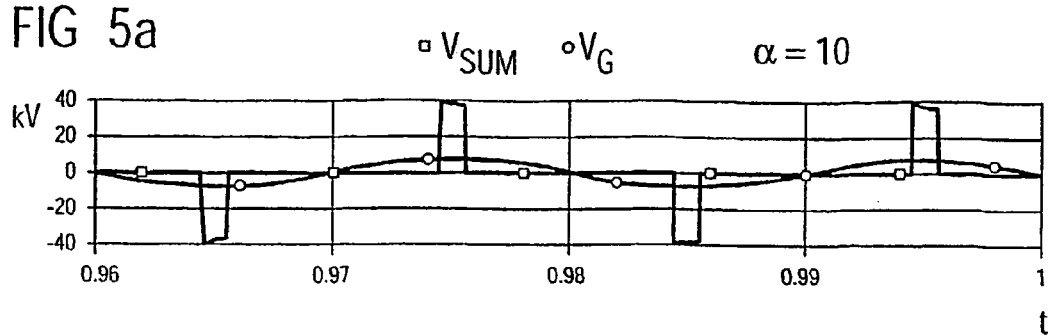
FIG 5a — $V_{SUM}$ $V_G$ $\alpha = 10$
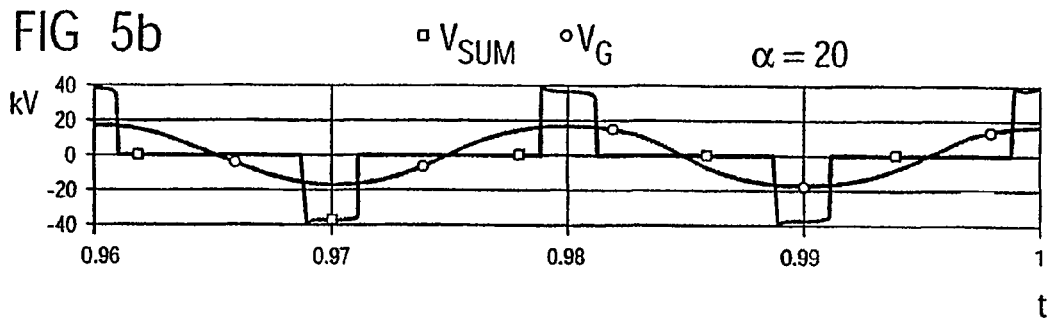
FIG 5b — $V_{SUM}$ $V_G$ $\alpha = 20$
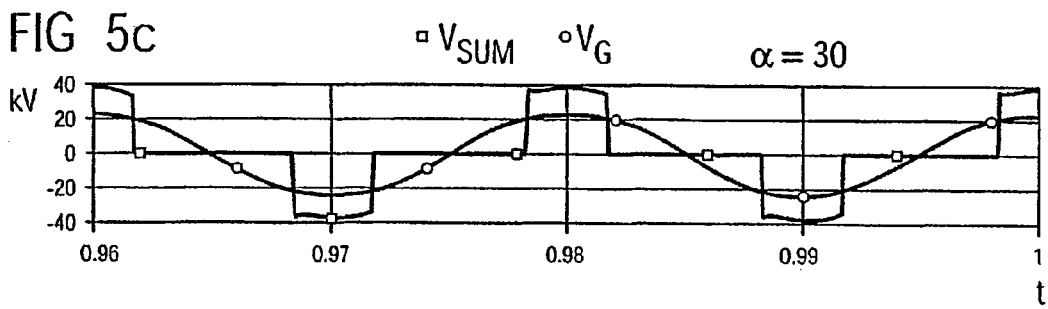
FIG 5c — $V_{SUM}$ $V_G$ $\alpha = 30$
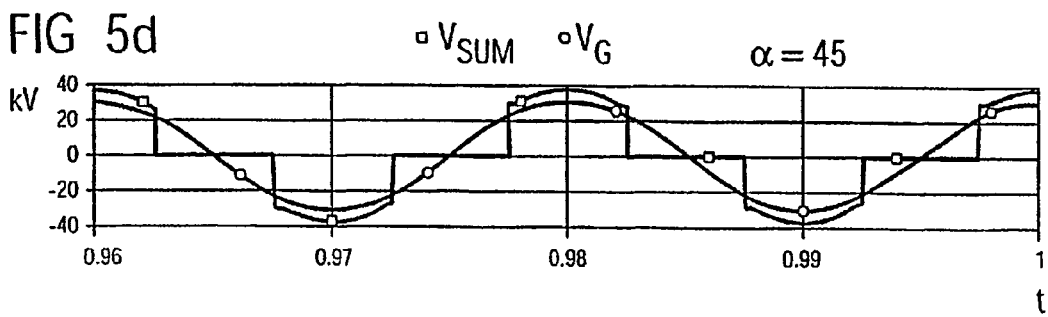
FIG 5d — $V_{SUM}$ $V_G$ $\alpha = 45$
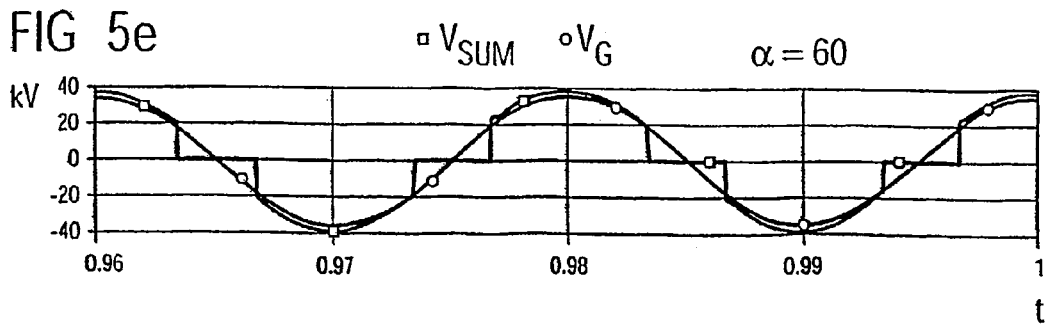
FIG 5e — $V_{SUM}$ $V_G$ $\alpha = 60$

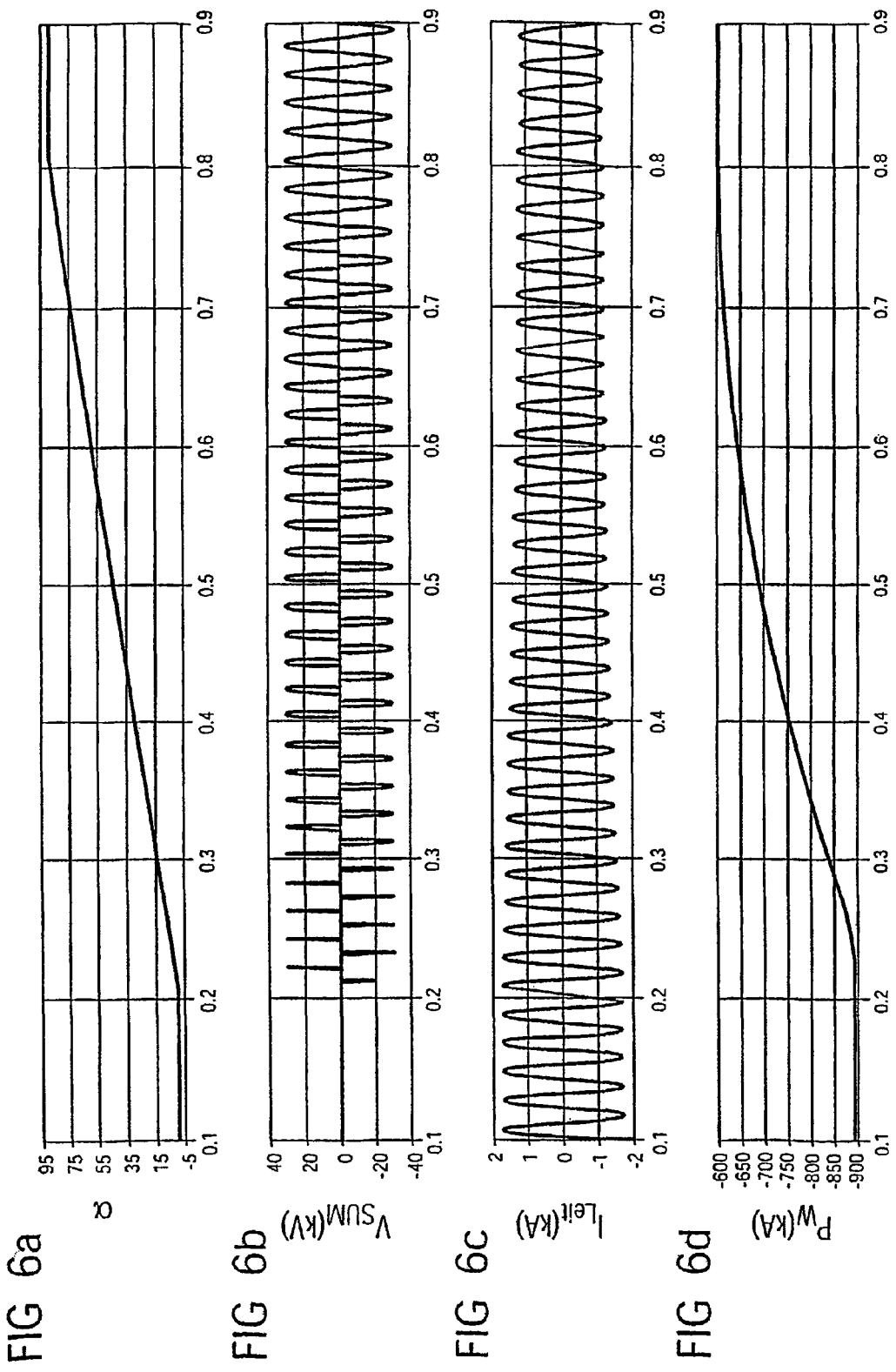

DEVICE FOR ADJUSTING THE IMPEDANCE OF A HIGH VOLTAGE LINE SUPPLYING AN ALTERNATING CURRENT

CROSS-REFERENCE TO RELATED APPLICATIONS

This application is a U.S. national stage application of International Application No. PCT/DE2004/001972 filed Sep. 1, 2004, which designates the United States of America, and claims priority to German application number DE 10345020.3 filed Sep. 23, 2003, the contents of which are hereby incorporated by reference in their entirety.

TECHNICAL FIELD

The invention relates to an apparatus for adjustment of the impedance of a high-voltage line which carries an alternating current and comprises a plurality of phases, having at least one control coil which can be inserted into the high-voltage line connected in series, and having at least one switching device which is in each case associated with one of the control coils, with a control unit being provided in order to control each switching device in such a manner that the effective reactance of the control coil in the apparatus can be adjusted by the switching of the switching device.

The invention also relates to a method and a control unit for adjustment of the impedance of a high-voltage line which carries alternating current.

BACKGROUND

An apparatus such as this, a method such as this and a control unit such as this are known, for example, from DE 37 87 355 T2. The apparatus disclosed there is also illustrated in FIG. 1 of the attached drawing. The already known apparatus 1 has a control coil 2 and an uncontrolled coil 6 which can be inserted in series into a high-voltage line, which carries alternating current, by means of expedient connections or switches which are not shown in FIG. 1. In order to control the effective impedance of the control coil 2 in the apparatus 8, a switching device 3 is provided, and is formed by two thyristors which are connected in opposite senses. The thyristors are connected to a control unit 4, whose control signals allow the current flow through the thyristors to be interrupted or permitted. The effective impedance of the control coil 2 in the apparatus, and thus the impedance of the entire apparatus, can be adjusted by expedient choice of the triggering time of the thyristors as a function of the phase of an alternating current in the high-voltage line. This response time of the thyristors, which is dependent on the phase of the alternating current, is referred to in the following text as the trigger angle. The use of the thyristors in the control path 5 for solid-state interruption of the alternating current also results in higher-order harmonic of the fundamental frequency of the alternating current, that is to say integer multiples of the fundamental frequency of the alternating current. For this reason, a filter unit 7 is provided in parallel with the control path 5 and is designed to suppress one or more of these harmonic oscillation components. Furthermore, the filter unit and the filter coil 6 are used to maintain the current path through the apparatus when the switching device 3 is in a position in which the current flow is interrupted. However, the already known apparatus occupies a large amount of space and is costly because of these additional components. Furthermore, the control capabilities of the already known apparatus are restricted, since its impedance cannot be reduced to zero, but only to the impedance of the parallel-connected coils 2 and 6.

SUMMARY

One object of the present invention is thus to provide an apparatus of the type mentioned initially which is compact and cost-effective, as well as a method as mentioned initially, and a control unit, by means of which the impedance of a high-voltage line can be controlled in a simple manner.

With regard to the apparatus, this object can be achieved by arranging each switching device in a parallel path in parallel with the control coil associated with it.

Furthermore, this object can also be achieved by a method in which the control coil is bridged as a function of the phase of the alternating current by triggering a switching device which is arranged in a parallel path in parallel with a control coil which can be inserted in series into the high-voltage line, with the impedance of the high-voltage line being adjusted in this way.

Furthermore, this object can also be achieved by a control unit for adjustment of the impedance of a high-voltage line which carries alternating current, having a phase sensor for production of a zero-crossing signal on verification of a zero crossing of the alternating current, and having at least one trigger unit, which is connected to a phase measurement device and to a trigger angle transmitter for production of a trigger angle for the trigger unit, and which produces a trigger signal after a delay time corresponding to the trigger signal, on receiving a zero-crossing signal, which trigger signal is used to control the impedance of the high-voltage line by using a switching device to bridge a control coil, which is inserted in series into the high-voltage line.

BRIEF DESCRIPTION OF THE DRAWINGS

Further expedient refinements and advantages of the invention are the subject matter of the following description of the exemplary embodiments of the invention with reference to the figures of the drawing, in which components which have the same effect are provided with the same reference symbols, and in which:

FIG. 4 shows the reactance of the apparatus shown in FIG. 2 with respect to the reactance of the control coil, as a function of the trigger angle, FIG. 5 shows the fundamental frequency component of the voltage which is dropped across the apparatus at various trigger angles, FIG. 6 shows a digital simulation of the change in power flow in the high-voltage line when the trigger angle of the circuit device of the apparatus shown in FIG. 2 is varied.

DETAILED DESCRIPTION

Figure 1:
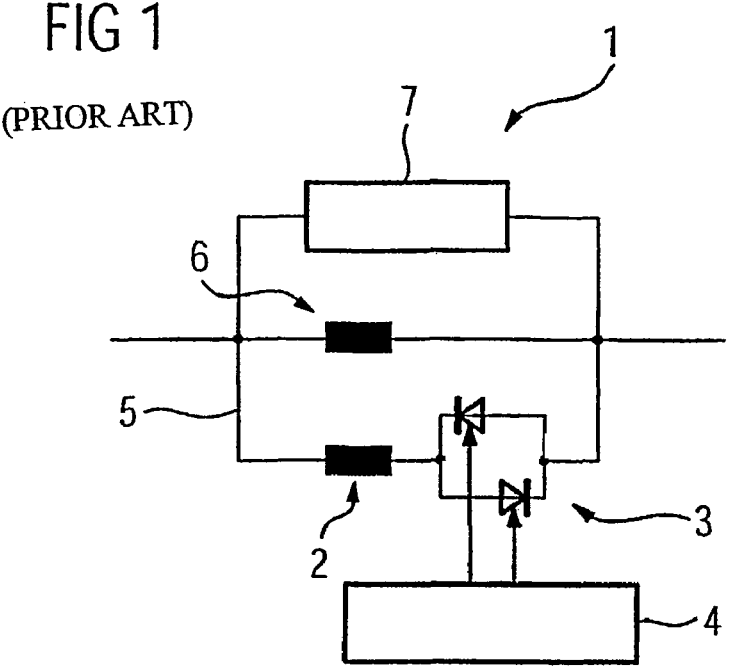
FIG. 1 shows an apparatus of this generic type according to the prior art.

According to an embodiment, the control coil is no longer arranged connected in series with the switching device, as in the prior art. In fact, the control coil can be bridged by the switching device, by which means a control method according to the invention, which differs from the prior art, is linked. The switching arrangement according to an embodiment also makes it possible to dispense virtually completely with additional uncontrolled coils or filter units. It should be noted that a control coil need not be in the form of a single component for the purposes of the invention. In fact, according to an embodiment, it is also possible to connect a plurality of coils in series in the respective parallel path. In this case, the expression "control coil" should be understood as meaning the sum of all of the coils in the parallel path.

The method according to an embodiment is used to control the apparatus according to an embodiment. In this case, the method according to an embodiment is preferably carried out by means of the control unit according to an embodiment.

The apparatus according to an embodiment advantageously has a parallel path which has no inductive components such as coils or the like even when these are provided only to suppress transient effects, and have no influence on the control characteristic.

According to an embodiment, the switching unit may be a high-speed mechanical switch. However, at least one switching device expediently comprises thyristors which are connected in opposite senses. The use of thyristors improves the capabilities for controlling the impedance by means of the control unit. According to an embodiment, by way of example, the thyristors are used as high-speed switches. Their switching response can be matched to the respectively required circumstances by means of so-called electrical or optical trigger signals, and thus in a particularly simple manner. All semiconductor components which are already known and are compatible with high voltages, and which are based on silicon or else carbide, are suitable for use as thyristors. Examples of suitable silicon thyristors include electrically triggered thyristors, optically triggered thyristors, so-called GTOs or else IGBTs.

The control unit advantageously has a zero-crossing unit, which is connected to current sensors, in order to verify a zero crossing of the alternating current, and at least one trigger unit, which is connected to a trigger angle transmitter. According to an embodiment, the current sensor can thus be a current sensor which emits digital current values and has a current transformer in order to produce a secondary current that is proportional to the alternating current, a sampling device for sampling the secondary current at a sampling clock rate in order to obtain current values, and an analog/digital converter in order to convert the sampled current values to digital current values. A change in the mathematical sign is identified, for example, by conventional software for this purpose in the zero crossing unit, which then sends a zero crossing signal to the trigger unit which is connected to it. The trigger unit is supplied with a trigger angle via the trigger angle transmitter. This trigger angle corresponds to a time period after which the trigger unit sends a trigger signal to trigger the thyristors, to these thyristors, following a zero crossing of the alternating current. This therefore allows any desired phase shift between the zero crossing of the alternating current and the current bridging by the thyristors by the choice of the trigger angle.

According to an embodiment which differs from this, the control unit can be in the form of an analog control unit with the normal components relating to this that are known to those skilled in the art.

According to a further embodiment, the trigger angle transmitter is connected to a current sensor in order to measure the alternating current, and is connected to a voltage sensor in order to measure the voltage on the high-voltage line with respect to the ground potential or with respect to the voltages between the phases, with the control unit having a read only memory element which is provided for storage of control parameters, with at least one matching unit being provided in order to detect discrepancies between the control parameters and the measured values from the current sensor and/or the voltage sensor, or between the control parameters and measurement variables which are calculated from the measured values from the current sensor and/or voltage sensor. In other words, each matching unit is provided with one or more nominal values which, for example, correspond to a nominal current value, to a nominal voltage value or, for example, to a nominal value of a real power or wattless component calculated from these two electrical variables. If the respective matching unit detects a difference which exceeds the tolerance range between the respectively measured actual and nominal values or between the actual values as calculated from the measured variables and the nominal values, it shifts the trigger angle in the direction such that the discrepancy between the actual value and the nominal value is once again shifted into the tolerance range. The tolerance range is dependent on the respective application of the apparatus, and is typically 1% of the respective nominal parameter.

According to a further embodiment, the apparatus can be provided with two control coils arranged in series which each have a switching device arranged in a parallel path connected in parallel. According to this further embodiment, it is possible to design the overall apparatus using high-voltage components which occupy less space than apparatuses with a control coil which can be bridged. Furthermore, the harmonic component of the voltage which is dropped across the apparatus is less than that of an apparatus with only one controllable reactance.

According to a further embodiment, the control unit has two trigger units which each interact with a switching device. The control unit is also connected to two different trigger angle transmitters, so that the timing of the trigger of the switching devices can be controlled independently of one another.

In the case of this refinement, a further embodiment is possible in which only one of the switching devices has thyristors which are connected in opposite senses, with the other switching device being in the form of a mechanical switch. This admittedly reduces the control capabilities of the apparatus. However, a variant such as this is cost-effective, and its control capability is simplified.

According to an embodiment, a capacitor can be advantageously provided, which is connected in series with the control coil and can be bridged by means of a capacitor switching unit which is arranged in parallel with the capacitor in a capacitor parallel path. The addition of a capacitor connected in series considerably widens the impedance range which can be controlled by the apparatus. According to this further embodiment, two controllable reactance ranges are provided, although only one common controller is required to control the overall impedance. The series arrangement of controllable reactances can, of course, also be added to by further modules of this type arranged connected in series.

According to a further embodiment, a filter unit is provided and is arranged in parallel with a series path in which the control coil and the capacitor are connected in series. The filter units can be used only when a capacitor or a coil is also provided in the bridged series circuit, in addition to at least one control coil.

According to a further embodiment of the control unit, at least one of the switching devices is formed by thyristors which are connected in opposite senses. All of the switching devices may, of course, also comprise thyristors which are connected in opposite senses.

Figure 2:
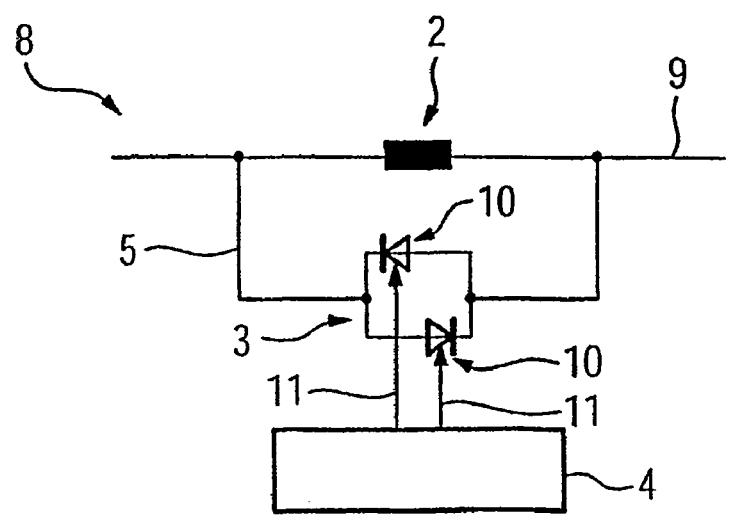
FIG. 2 shows one exemplary embodiment of the apparatus according to the invention.

FIG. 2 shows an exemplary embodiment of the apparatus 8 which can be inserted into a high-voltage line 9 via switches which cannot be seen in FIG. 2, with the high-voltage line 9 being provided in order to transmit power between two nodes of an electrical power distribution network. In this case, the apparatus 8 is arranged in series with the high-voltage line 9 in such a way that all of the alternating current which is carried by the high-voltage line 9 flows via the apparatus 8. In the normal way, the high-voltage line comprises three phases, that is to say three high-voltage conductors which are routed alongside one another, and of which only one phase is illustrated in the figures of the drawing, for clarity reasons. The other phases, which are not shown, of the high-voltage line 9 are connected to the apparatus 8 in the same way as the phase which is illustrated in the figures of the drawing. The device 8 may, of course, be connected in a corresponding manner to a high-voltage line which has more than three phases or less than three phases.

The apparatus 8 has a control coil 2 and a switching device 3, which in this case is formed by two thyristors 10 which are connected in opposite senses. In this case, the switching device 3 is arranged in the parallel path 5, in parallel with the control coil 2.

The thyristors 10 are each connected via expedient control lines 11 to a control unit 4, which is designed to produce a trigger signal as a function of the phase of the alternating current in the high-voltage line 9.

FIG. 3 illustrates the method of operation of the apparatus 8 according to an embodiment as shown in FIG. 2 on the basis of time-resolved schematic current and voltage curves. FIG. 3a shows two oscillation periods of an idealized sinusoidal alternating current $I_{on}$ in the high-voltage line 9, with the alternating current amplitude being 1.5 kA. At the time $t_0$, the thyristors 10 in the switching device 3 are in an off position, so that the current passed via the control coil 2 and illustrated in FIG. 3b essentially corresponds to that of the alternating current in the high-voltage line 9. The current passed via the parallel path 5 is illustrated in FIG. 3c. In consequence, this is equal to zero at the time $t_0$.

When the time indicated by α in FIG. 3 is reached, the thyristors 10 in the switching device 3 are triggered by the control unit 4. Because of the self-induction in the coil, the coil current shown in FIG. 3b remains essentially constant. The current which is carried via the parallel path 5 and is shown in FIG. 3c likewise reaches a relative minimum at the vertex point of the alternating current. At the time which is indicated by β, the current carried via the parallel path and thus via the switching device 3 with the thyristors 10 is equal to zero, so that the thyristors 10 are once again changed to the off position. After this time, the current carried via the control coil 2 once again corresponds to the alternating current in the high-voltage line 9. This process is then repeated, but this time in the positive region of the alternating current, that is to say with the alternating current having the opposite mathematical sign.

Figure 3A:
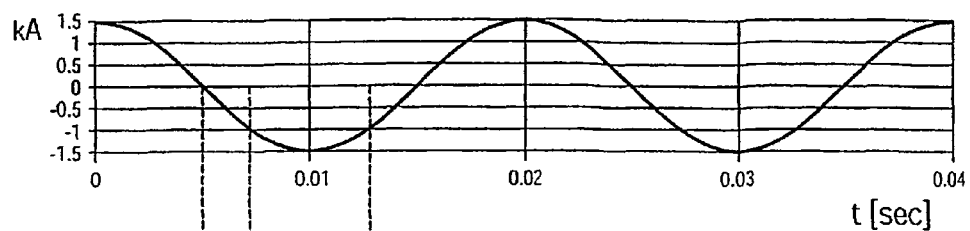
FIG. 3 shows the method of operation of the apparatus shown in FIG. 2 on the basis of current or voltage curves, resolved on a time basis, and illustrated schematically.
Figure 3B:
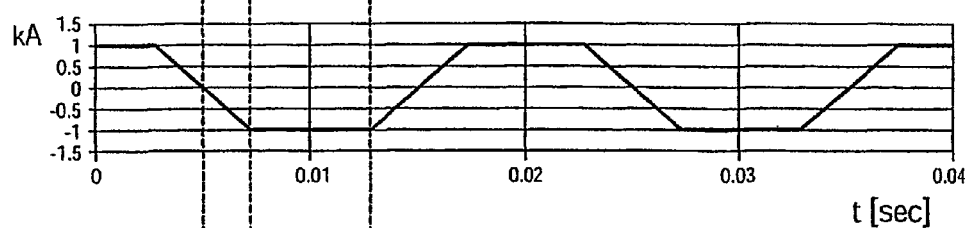
Figure 3C:
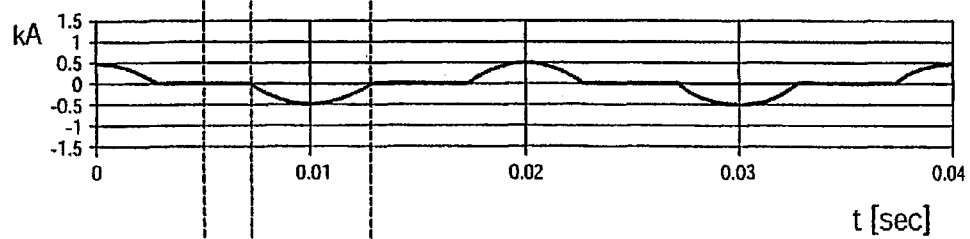
Figure 3D:
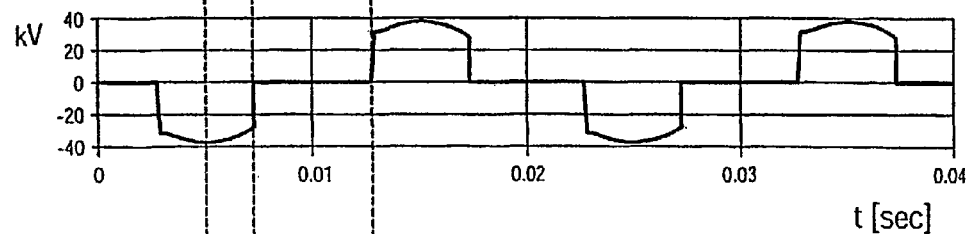

FIG. 3d shows the voltage which is dropped across the switching device 3. Its magnitude is a maximum at the time $t_0$, and corresponds to a magnitude of about −40 kV. The thyristors 10 are triggered at the time α, following which the voltage falls to a zero value in order to rise to +28 kV at the time β.

Figure 3E:
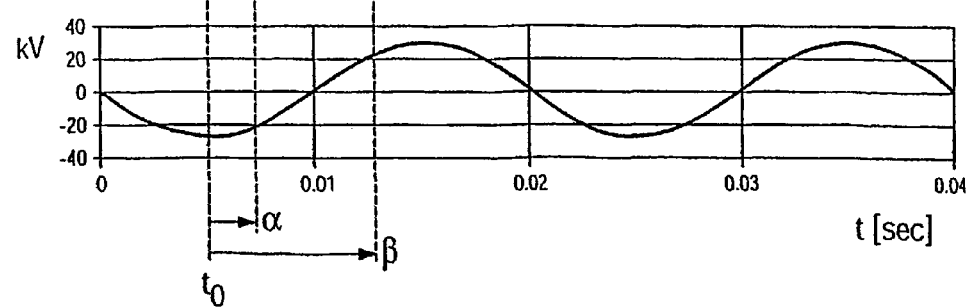

FIG. 3e shows the results of the calculation of the fundamental frequency component of the voltage which is dropped in total across the apparatus 8. As can be seen, the fundamental frequency component of the voltage is phase-shifted through +90 degrees with respect to the current shown in FIG. 3a. As will be described in the following text, the amplitude of the fundamental frequency component is dependent on the trigger angle α. For this reason, the apparatus 8 acts as a controllable reactance.

The voltage which is dropped across the triggering apparatus 8 in the time period between the first triggering of the thyristors α and the subsequent interruption of the current by the thyristors π−α, that is to say β, is equal to zero, as can be seen in FIG. 3d. When the thyristors 10 are switched off, the voltage V(t) which is dropped depends on the change in the current as well as the inductance of the control coil. In this case:

$$V(t)=0 \text{ for } \alpha<\omega t<(\pi-\alpha)$$

$$V(t) = L_{RSP}\frac{d(I_{on})}{dt},$$

for $(\pi-\alpha)<\omega t<(\pi+\alpha)$, where $I_{on}$ corresponds to the alternating current in the high-voltage line 9 and $L_{RSP}$ corresponds to the inductance of the control coil. The trigger angle is α in radians, and ω—likewise in radians—represents the angular velocity. On the basis that $I_{on}=I_0 \sin(\omega t)$, $$V(t)=L_{RSP}\omega I_0 \cos(\omega t) \text{ for } (\pi-\alpha)<\omega t<(\pi+\alpha)$$

The fundamental frequency component of V(t) can be calculated using Fourier techniques. This is based on the approximate assumption that the resistance of the apparatus is equal to zero. The only voltage component of the voltage which is dropped across the apparatus 8 that is of interest is thus that which is in phase with cos(ωt). As shown in FIG. 3, the positive and negative half cycles of the voltage which is dropped across the apparatus are symmetrical. The magnitude of the component of the fundamental frequency of the voltage $V_{SUM}$ which is dropped across the apparatus 8 is thus given by:

$$V_{SUM} = \frac{2}{\pi} \cdot \int_{\pi-\alpha}^{\pi+\alpha} V(t) \cdot \cos(\omega \cdot t) \cdot d(\omega \cdot t)$$

$$= \frac{2}{\pi} \cdot I_0 \cdot \omega \cdot L_{RSP} \cdot \int_{\pi-\alpha}^{\pi+\alpha} \cos^2(\omega \cdot t) \cdot d(\omega \cdot t)$$

$$= \frac{2}{\pi} \cdot I_0 \cdot \omega \cdot L_{RSP} \cdot \left( \alpha + \frac{\sin(2 \cdot \alpha)}{2} \right)$$

for $\alpha$ between 0 and 90 degrees.

The reactance at the fundamental frequency is thus:

$$\frac{X_{SUM}}{X_{RSP}} = \frac{2}{\pi} \cdot \left( \alpha + \frac{\sin(2 \cdot \alpha)}{2} \right)$$

FIG. 4 shows the reactance of the apparatus 8 $X_{SUM}$, normalized with respect to the reactance of the control coil 2 $X_{RSP}$, as a function of various trigger angles $\alpha$, as is indicated in FIG. 4, with the units being radians. As can be seen, the impedance of the apparatus 8 according to an embodiment is negligible at trigger angles in the region of 0 degrees, while it approaches the maximum value asymptotically at trigger angles greater than 70 degrees, with this maximum value being determined by the reactance of the control coil $X_{RSP}$.

FIG. 5 shows the total voltage $V_{SUM}$ which is dropped across the apparatus 8, with the functional profile being identified by quadrilateral points. Furthermore, FIG. 5 shows the fundamental frequency component of the voltage, calculated on the basis of a simplified model, in the form of a curve $V_G$, which is identified by round points. The calculation was based on the assumption of an ideal sinusoidal alternating current with an amplitude of 1.5 kA, with the control coil 2 having an inductance of 80 MilliHenrys. FIG. 5a shows the voltage profiles for a trigger angle $\alpha$ of 10°. This means that a control pulse for the thyristors 10 is triggered after just a short time period following a zero crossing of the alternating current in the high-voltage line 9, as a result of which the control coil 9 is bridged, and the voltage is dissipated.

The trigger angles a in FIGS. 5b, 5c, 5d and 5e were 20, 30, 45 and 60°, respectively. As can be seen, the amplitude of the fundamental frequency rises as the trigger angle becomes larger, and, in FIG. 5e, the profile of the fundamental frequency corresponds essentially to the voltage drop across the apparatus 8.

FIG. 6 shows a digital simulation based on the same simplified model that was also used as the basis for FIG. 5. The illustrated results are based on the assumption of a high-voltage line having a reactance of 45 Ohms at 50 Hz, with the apparatus 8 being fitted with a control coil 2 of 80 MilliHenrys. The respective trigger angle $\alpha$ in radians, chosen for the calculation, is plotted in FIG. 6a as a function of the time in seconds, with $\alpha$ still being zero after 0.2 s, and with $\alpha$ having risen to 90 degrees after 0.8 s. FIG. 6b also shows the voltage of $V_{SUMm}$ dropped across the apparatus as a function of the time, whose profile approaches a sinusoidal profile to an ever greater extent as the trigger angle increases. The alternating current in the high-voltage line is plotted in FIG. 6c, and its amplitude decreases as the trigger angle increases. FIG. 6d shows the real power $P_w$ which is transported through the high-voltage line and whose magnitude, as expected, decreases as the trigger angles $\alpha$ become greater.

Figure 7:
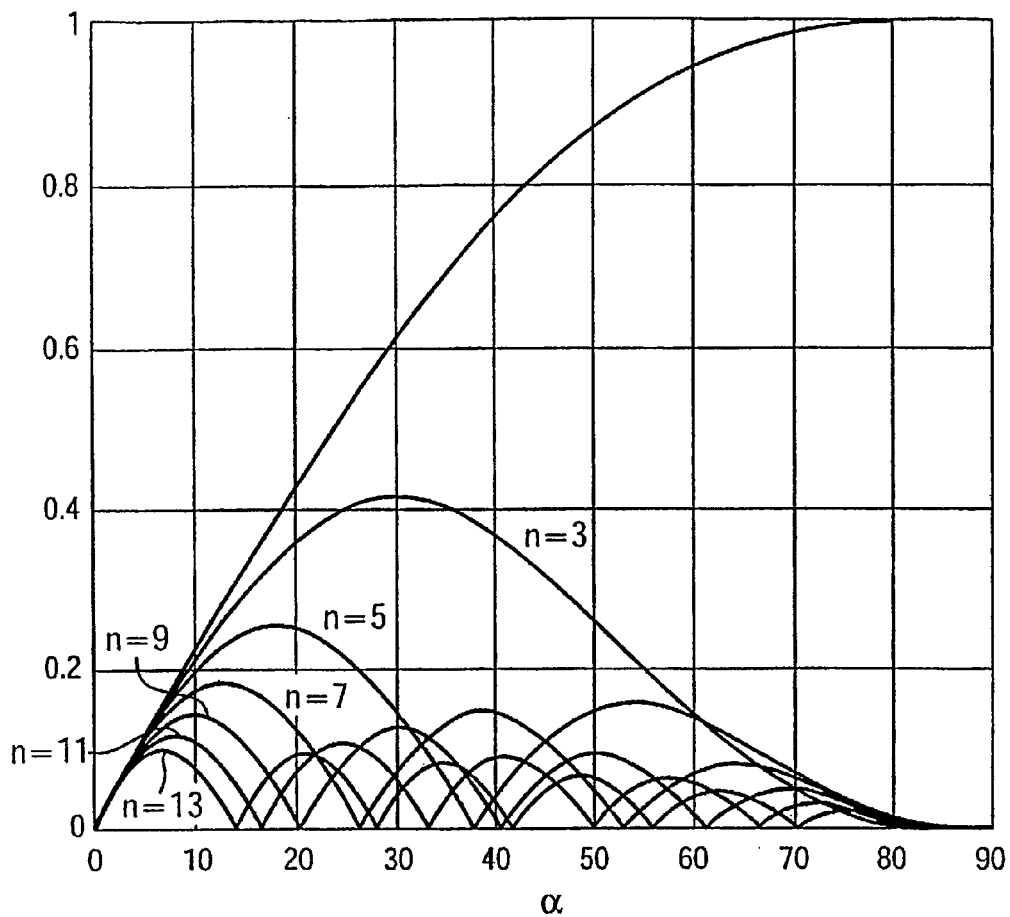
FIG. 7 shows the components of the fundamental frequency and of the higher harmonic oscillations of the voltage which is dropped across the apparatus as shown in FIG. 2 when the alternating current is constant, as a function of the trigger angle.

FIG. 7 shows the amplitudes of the fundamental frequency and of the higher harmonic oscillation components of the voltage which is dropped across the apparatus 8 up to the 13th harmonic $V_x$ with respect to the amplitude of the total voltage $V_{SUM}$, as a function of the trigger angle $\alpha$. As can be seen, the amplitude Y of the higher harmonics decreases as the trigger angles become greater, and the fundamental frequency component of the total voltage is virtually 100% at trigger angles of 90 degrees.

Figure 8:
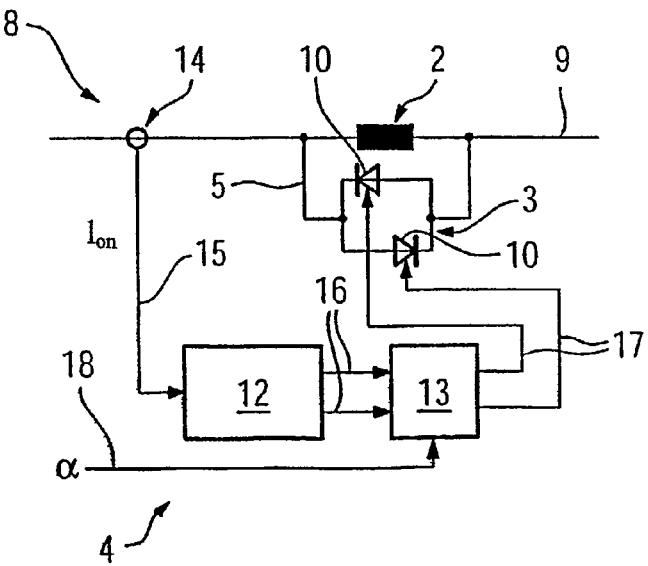
FIG. 8 shows an illustration showing the control unit of the apparatus illustrated in FIG. 2.

FIG. 8 shows the apparatus 8 as shown in FIG. 2, but with the control unit 4 being illustrated in more detail. As can be seen in FIG. 8, the control unit 4 comprises a zero crossing sensor 12 as well as a trigger unit 13, with the zero crossing sensor 12 being connected to a current sensor 14. For its part, the current sensor 14 comprises, for example, a current transformer, which is not shown but produces a secondary current which is proportional to the alternating current in the high-voltage line 9, is sampled by a sampling unit (which is likewise not shown) in the current sensor 14 in order to obtain sample values, with the sample values then being converted by an analog/digital converter (which is not shown) to digital current values $I_{on}$, and being supplied to the zero crossing sensor 12 via a connecting line 15. When the zero crossing sensor 12 detects a change in the mathematical sign of the digital current values $I_{on}$, it sends zero crossing pulses 16 to the trigger unit 13. Receiving the zero crossing pulses 16, the trigger unit 13 sends trigger pulses 17, after a delay time $\alpha$, to the thyristors 10 in the switching device 3, which are then switched from an off position, in which the current carried via the parallel path 10 is interrupted, to an on position, in which current can flow via the parallel path 5. The delay time by which the trigger unit 13 delays the emission of the trigger pulses 17 after receiving the zero crossing pulses 16 corresponds to the trigger angle $\alpha$, which is supplied to the trigger unit 13 via a signal line 18. The impedance can thus be controlled and thus the real power transmitted via the high-voltage line 9 can be regulated, by varying the trigger angle parameter $\alpha$ via the signal line 18.

Figure 9:
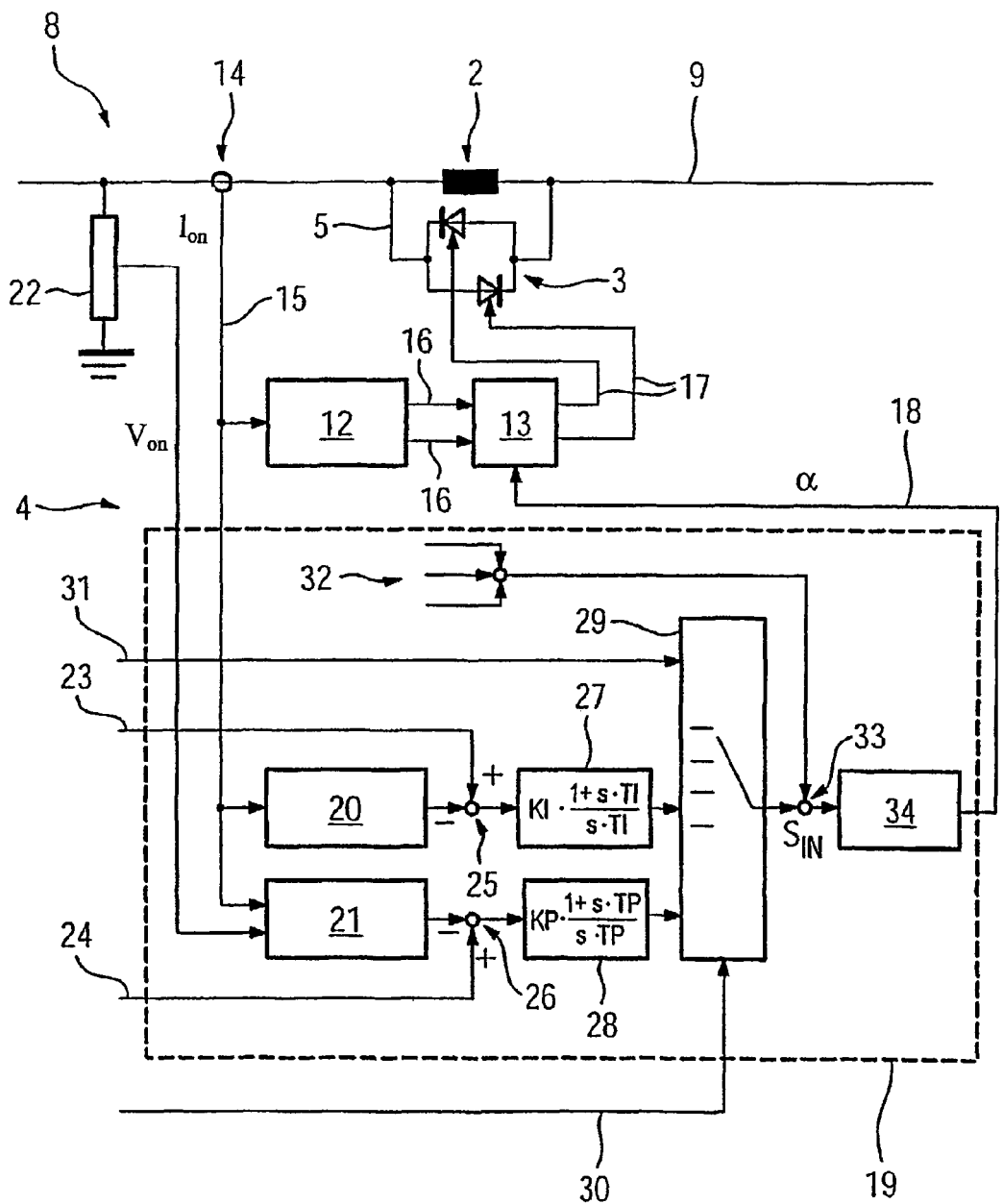
FIG. 9 shows a more detailed illustration of the control unit shown in FIG. 8, FIG. 10 and FIG. 11 show characteristics of the control unit as shown in FIG. 9.

FIG. 9 shows a more detailed illustration of the control unit 4 of the apparatus 8 as shown in FIG. 8 and, in particular, the components of a trigger angle transmitter 19 for production of a trigger angle $\alpha$ which is suitable for controlling the apparatus 8. The trigger angle transmitter 19 has a real-current sensor 20 and a real-power sensor 21. In this case, the real-current sensor 20 is connected to the current sensor 14 and is designed to receive the digital current values 19 which are produced by the current sensor, as described above.

The real-power sensor 21 is connected both to the current sensor 14 and to the voltage divider 22, whose output signal $V_{on}$ is proportional to the voltage on the high-voltage line 9 with respect to ground potential. The analog signals which are emitted from the voltage divider 22 are sampled and digitized by the real-power sensor 21, and are converted with the digital current values of the voltage standard 14 to digital power values, which correspond to the power transmitted through the high-voltage line 9.

The trigger angle transmitter 19 can also be supplied via a nominal current line 23 and via a nominal power line 24 with control parameters, with the control parameters in each case being supplied to a matching unit 25 and 26. The nominal current line 23 or the nominal power lines 24 is or are connected, for example, to a computer (which is not shown) or to a control console (which is not shown), so that a user is able to supply expedient control parameters to the control unit 4. The matching units 25 and 26 are each connected to a proportional/integral regulator 27 or 28, respectively, which is followed by a selection unit 29. The selection unit 29 is used to select the measurement variable which will be monitored by comparison with a control parameter and will be used to control the apparatus 8. In order to select the respective control parameter, the selection unit 29 is connected via a selection line 30 to, for example, the computer or the control console.

The selection unit 29 is also connected to a nominal trigger angle line 31. The trigger angle transmitter can thus be supplied directly with a nominal trigger angle, which can then be used to control the apparatus 8, by expedient adjustment of the selection unit 29 via the selection line 30.

Furthermore, additional control signals can be introduced via further control lines 32 into the trigger angle transmitter 19 from the exterior, for example via the control computer. The additional control signals 32 can also be supplied to the open-loop and closed-loop control measures described above, and can be used for open-loop control purposes. By way of example a matching unit 33 which is connected downstream from the selection unit 29 is used for closed-loop control purposes. Further control signals in this sense are, for example, known control variables to increase the transient stability of the power supply network. Furthermore, it is possible to use the apparatus 8 to damp sub-synchronous resonances.

At this point, it should be noted that FIGS. 8 and 9 illustrate the control process only in a schematic form, and any limiters, signal filters and the like which are used however, covered by the scope of the invention, although they are not expressively mentioned.

The output signal SIN from the matching unit 33 is supplied to a linearization unit 34, which is provided in order to compensate for any non-linear behavior of the impedance of the apparatus 8 with respect to said output signal $S_{IN}$.

Figure 10:
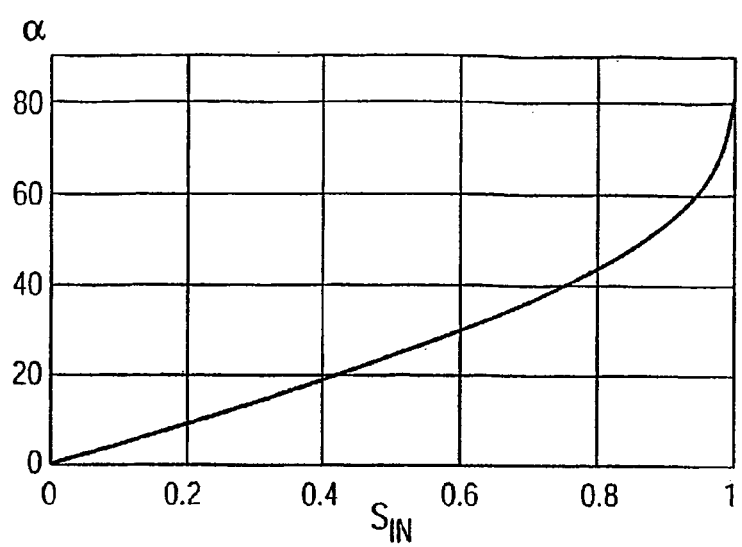
Figure 11:
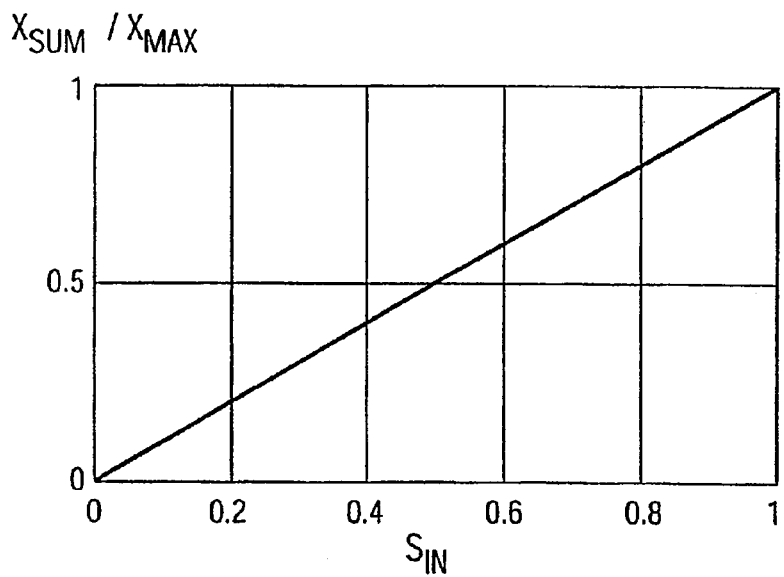

FIGS. 10 and 11 show the method of operation of the linearization unit 34. In FIG. 10, the output signal α from the linearization unit 34 is plotted on the ordinate as a function of the output signal from the selection unit 29 or from the matching unit 33, that is to say the input signal SIN to the linearization unit 34. As can be seen, there is a non-linear relationship between these signals. In FIG. 11, the reactance of the apparatus 8 $X_{SUM}$, normalized with respect to the maximum value $X_{MAX}$, is plotted on the ordinate between 0 and 1, as a function of the input signal SIN to the linearization unit 34, that is to say of the output signal from the selection unit 29. As can be seen, the linearization unit 34 produces the desired proportionality between these two variables.

Figure 12:
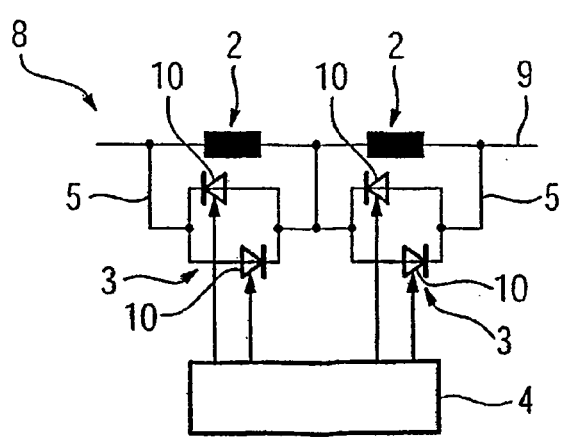
FIG. 12 shows a further exemplary embodiment of the apparatus according to the invention.
Figure 13:
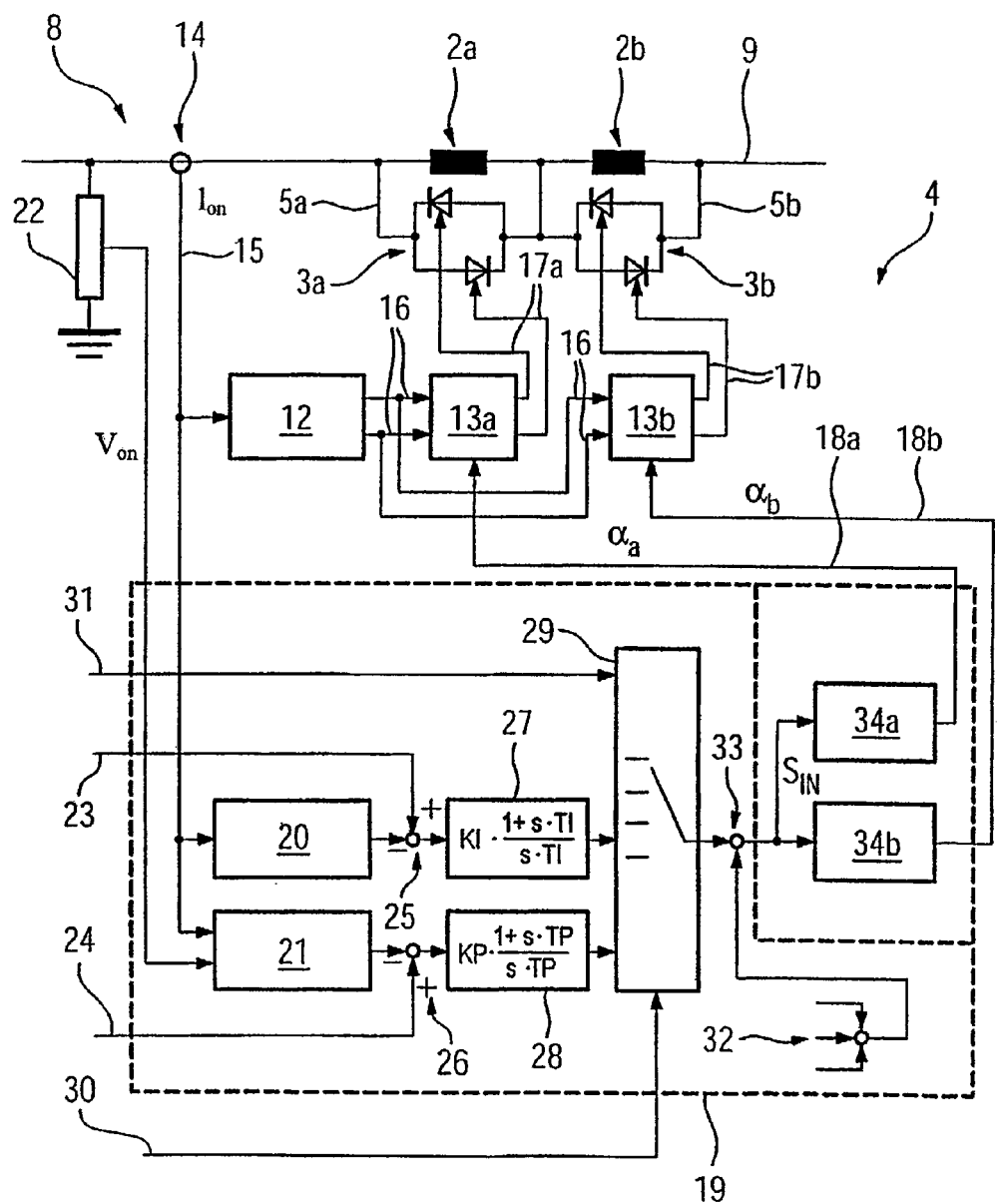
FIG. 13 shows the control means for an apparatus as shown in FIG. 12.

FIG. 12 shows a further exemplary embodiment of an apparatus which has two control coils 2, which are arranged connected in series and can each be bridged by a separate parallel path 5. In this case, each parallel path is provided with a switching device 3, whose thyristors 10, which are connected in opposite senses, are controlled by a common control unit 4. The common control of two switching devices 3 is illustrated in FIG. 13. As can be seen, the control unit 4 now has two trigger units 13a and 13b, which are each associated with a switching device 3a or 3b, respectively. In this case, the trigger units 13a and 13b are supplied with different trigger angles $α_a$ and $α_b$. For this purpose, the output signal from the selection unit 29 or from the matching unit 33 is split into two signals, and is respectively supplied to a linearization unit 34a, which is connected to the trigger unit 13a, and to a linearization unit 34b, which is provided in order to cause the trigger unit 13b to respond.

Figure 15A:
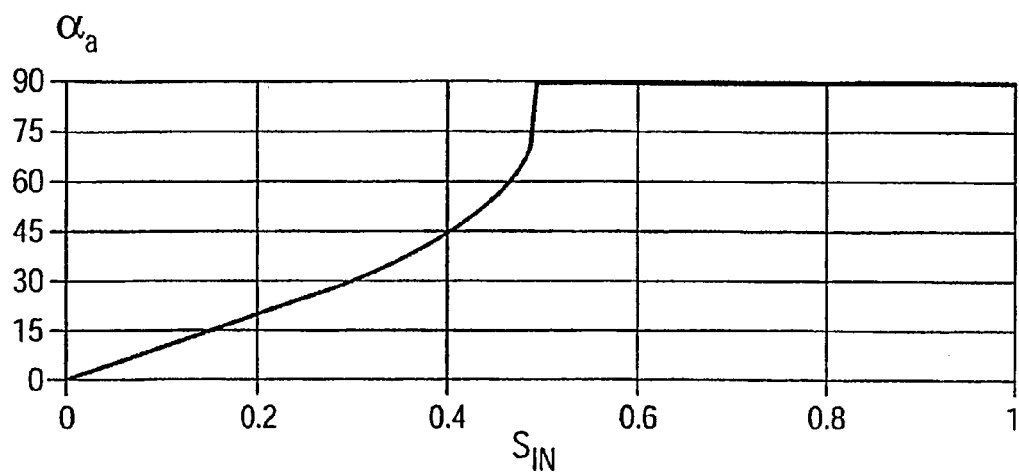
FIG. 15 shows characteristics of the control unit as shown in FIG. 13, FIGS. 16 and 17 show characteristics which differ from FIG. 15 for a control unit for an apparatus as shown in FIG. 13.
Figure 15B:
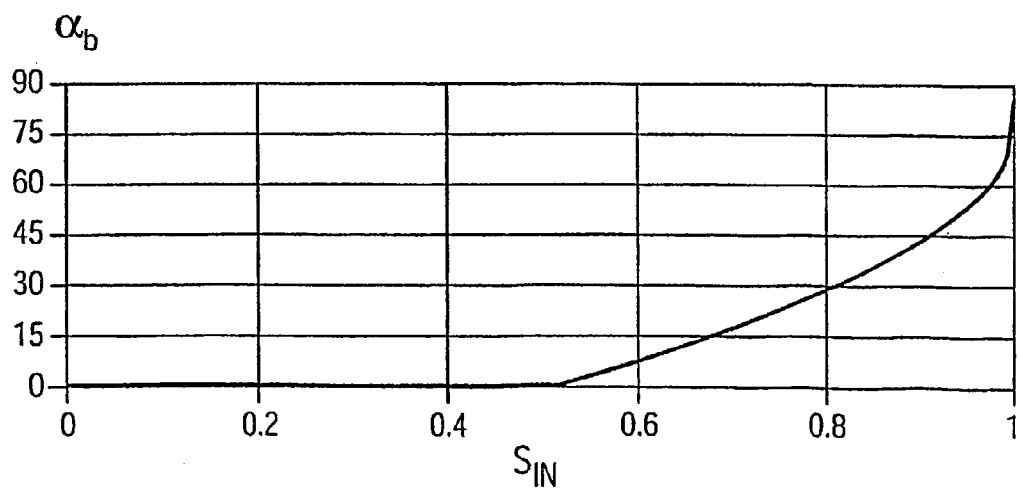

FIG. 15a shows the characteristic of the linearization unit 34a, with the characteristic of the linearization unit 34b being plotted in FIG. 15b. In this case, the trigger angles $α_a$ and $α_b$ which are emitted from the respective linearization unit 34a or 34b are plotted as a function of the output signal $S_{IN}$ from the matching unit 33.

Figure 14:
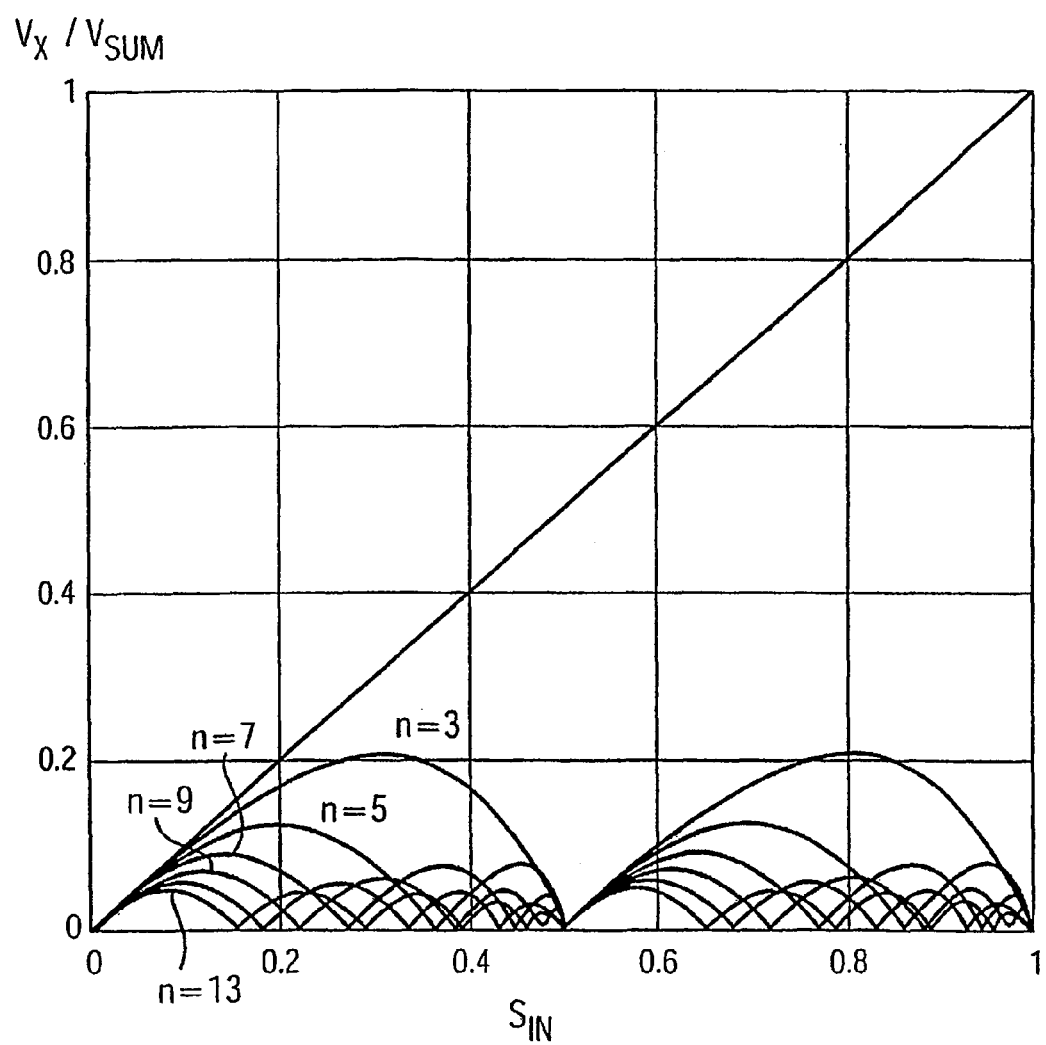
FIG. 14 shows calculated voltage profiles of the fundamental and harmonic voltage components as a function of the trigger angle of the apparatus shown in FIG. 13.

FIG. 14 shows an illustration, corresponding to FIG. 7, of the calculated amplitudes of the fundamental frequency and of the higher harmonic frequencies of the voltage $V_x$ which is dropped across the apparatus 8, normalized with respect to the total voltage $V_{SUM}$ dropped in total across the apparatus 8, as a function of the output signal $S_{IN}$ from the matching unit 33 of a control unit 4 as shown in FIG. 9. As can be seen, there is a particularly advantageous linear relationship between the output signal $S_{IN}$ from the matching unit 33 and the amplitude of the fundamental frequency.

Figure 16:
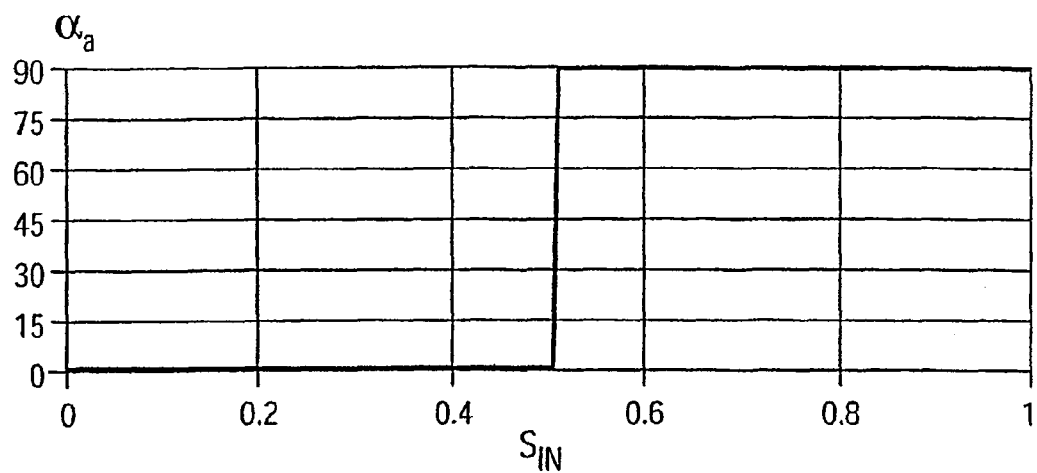
Figure 17:
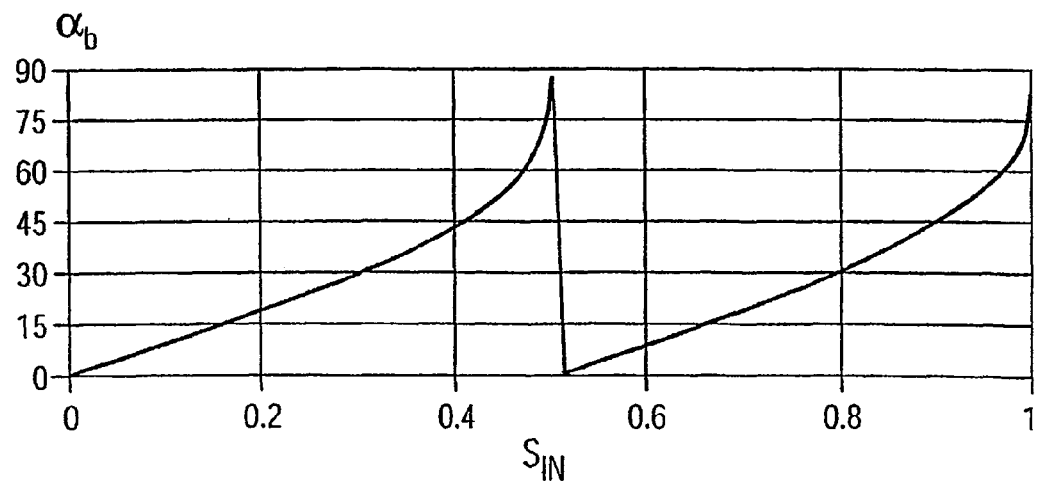

FIGS. 16 and 17 show a configuration, which is different to this, of the linearization units 34a and 34b as shown in FIG. 13. As can be seen in this case, the first switching device 3a, whose switching behavior is controlled by the linearization unit 34a, is operated as a high-speed switch. In the case of normalized output signals $S_{IN}$ from the matching unit 33 below 0.5, the switching device 3a remains in an on position, in which the thyristors 10 which are connected in opposite senses in the switching device 3 allow current to flow through the parallel path 10a. In the case of output signals $S_{IN}$ from the matching unit 33 of more than 0.5, the switching device 3a is switched to an off position, so that no current can flow via the parallel path 5a. This control process makes it possible to achieve a profile of the voltage amplitudes of the fundamental frequency components corresponding essentially to FIG. 14.

According to one different exemplary embodiment, which is not illustrated, the switching device annotated 3a in FIG. 12 is not formed by two thyristors which are connected in opposite senses but by a mechanical switch which interacts with the linearization unit 34a, whose characteristic corresponds to the characteristic shown in FIG. 16. The use of a mechanical switch instead of thyristors 10 results in cost advantages.

Figure 18:
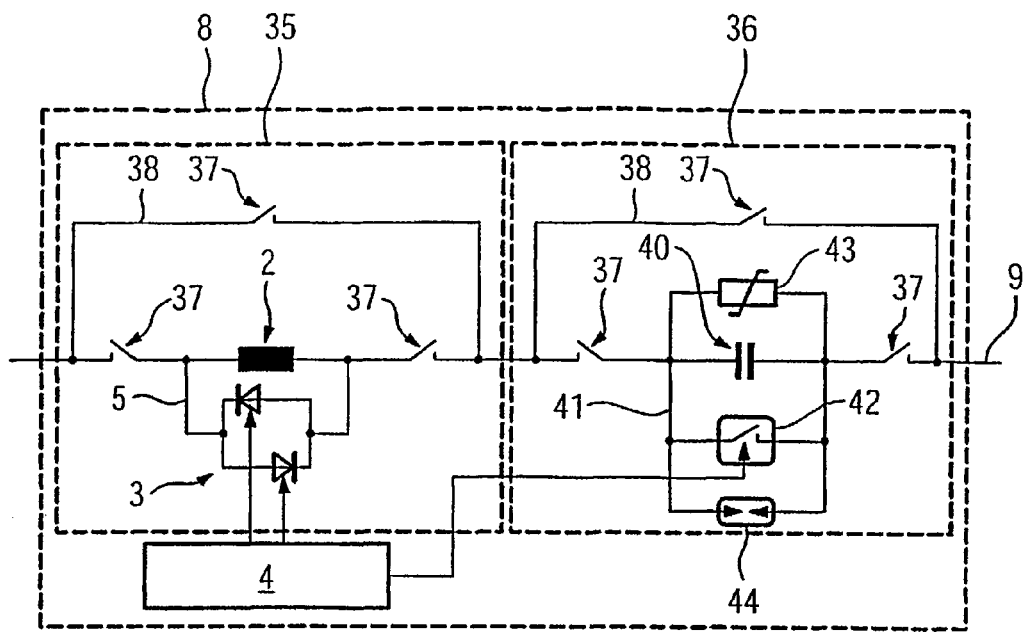
FIG. 18 shows a further exemplary embodiment of the apparatus according to the invention.

FIG. 18 shows a further exemplary embodiment of the apparatus 8. As can be seen, the apparatus 8 according to an embodiment, which is surrounded by a dashed line, comprises an inducted unit 35, which is surrounded by a further dashed line, and a capacitive unit 36, which is surrounded by a dashed line, which units 35 and 36 can be connected in series with one another by means of mechanical switches 37. The inductive unit 35 corresponds very largely to the exemplary embodiment of the apparatus as shown in FIG. 2, but with a bridging path 38 being provided in order to bridge the inductive unit 35. The capacitive unit 36 can likewise be bridged by means of a bridging path 38.

The capacitive unit 36 also has a capacitor 40 and a parallel path 41 in which a mechanical switch 42 is arranged. In addition, a varistor 43 and a spark discharge gap 44 are connected in parallel with the capacitor 40 and with the switch 42. The capacitive unit 36 thus corresponds to a solution which is already known per se in order to compensate for the impedance of a high-voltage line 9, with the exception that the switch 42 is opened and closed in order to bridge the capacitor 40 by means of the same control unit 4 which is also used to control the switching device 3 of the inductive unit 35. Connection of the inductive unit 35 and capacitive unit 36 in series in these ways widens the control range of the apparatus 8.

Figure 19:
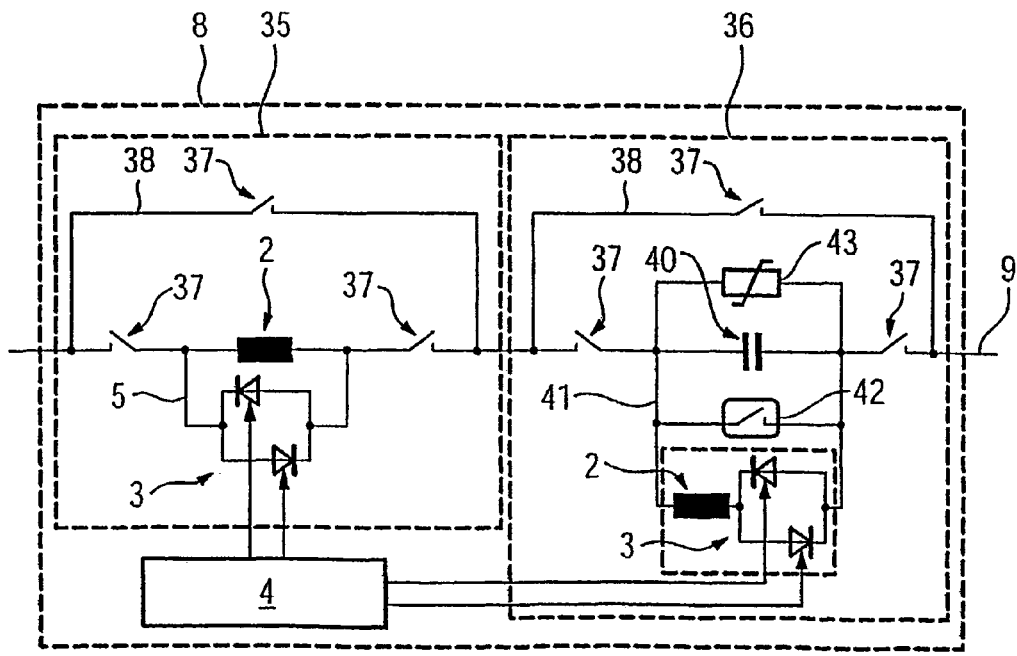
FIG. 19 shows a further exemplary embodiment of the apparatus according to the invention.

FIG. 19 shows an exemplary embodiment of the apparatus 8 which largely corresponds to the exemplary embodiment shown in FIG. 18. In the exemplary embodiment shown in FIG. 19, the control unit 4 in the inductive unit 36 causes a switching device 3 which is arranged in series with the control coil 2 to respond, however. In this case, the switching device 3 is once again formed by two thyristors 10 which are connected in opposite senses. The reactance of the control coil 2 of the apparatus is connected by triggering of the thyristors 10.

The capacitive unit 36 as shown in FIG. 19 correspond to an apparatus which is already known per se but which is used in this case, by means of the illustrated combination, to extend the application range of the apparatus 8 according to an embodiment, and at the same time to control the impedance of the high-voltage line 9.

Figure 20:
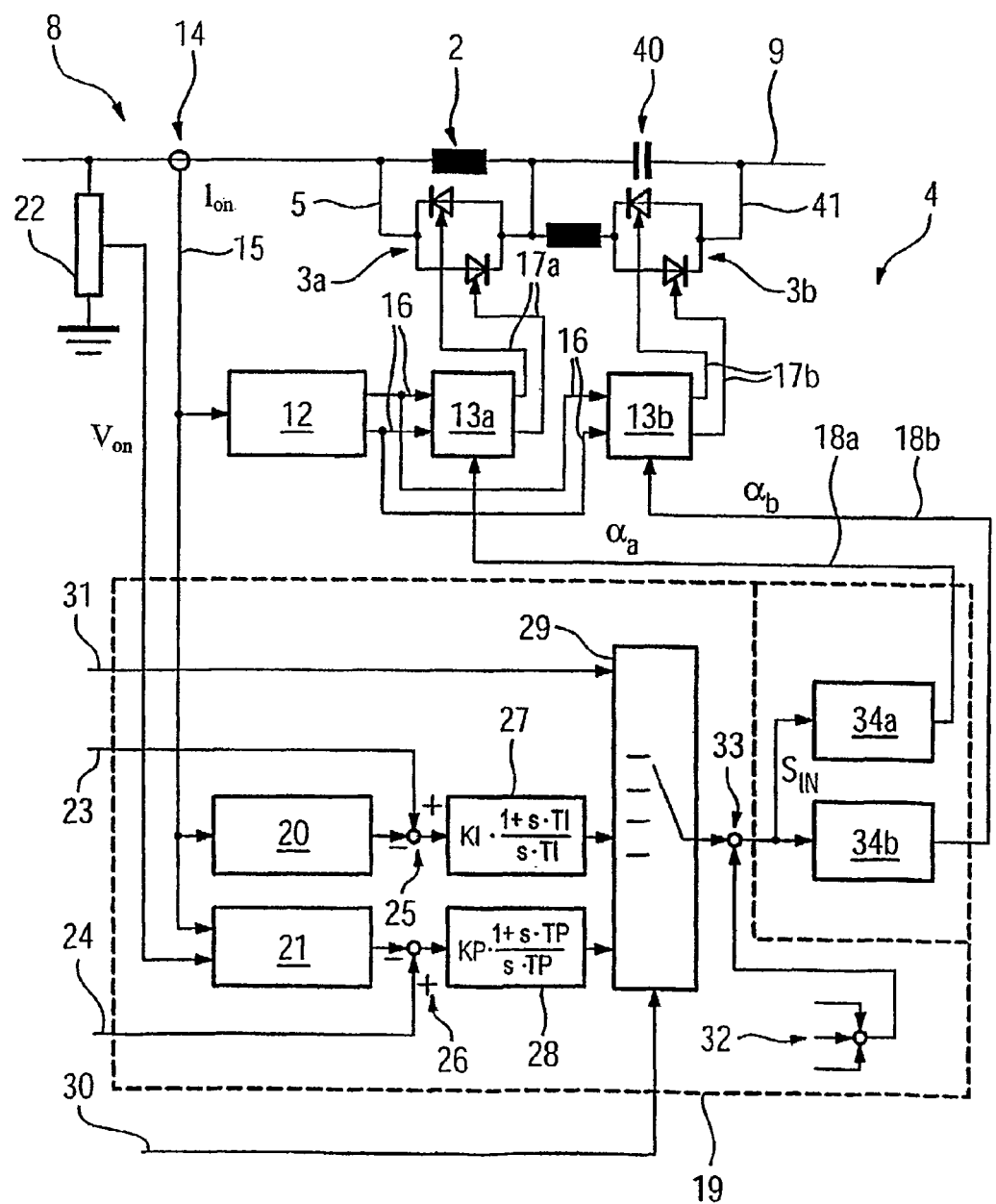
FIG. 20 shows an illustration showing how the apparatus illustrated in FIG. 19 is controlled.

FIG. 20 shows, schematically, the control unit 4 of the apparatus 8 shown in FIG. 19. As can be seen, in this case as well, two trigger units 13a and 13b are provided, and are connected to a respective switching device 3a and 3b. The trigger units 13a and 13b are once again connected to respectively associated linearization units 34a and 34b, which each have a different but expedient characteristic.

Figure 21:
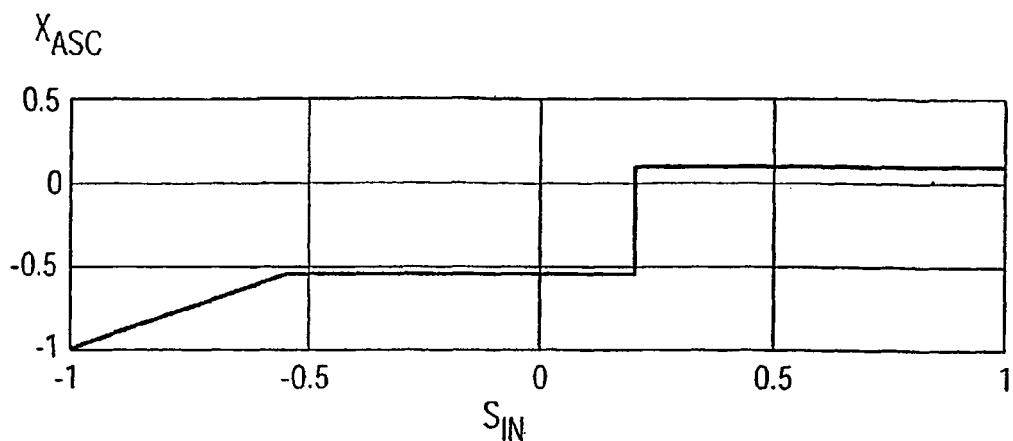
FIGS. 21 to 23 show characteristics of the control unit as illustrated in FIG. 20.
Figure 22:
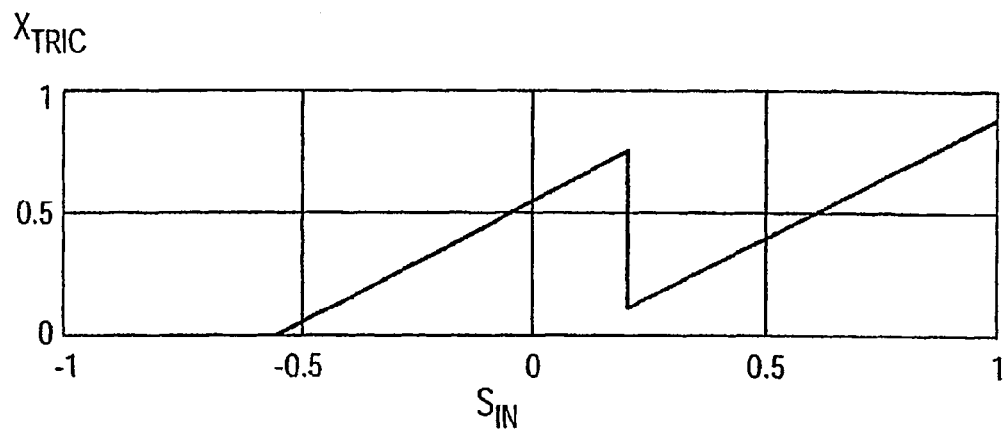
Figure 23:
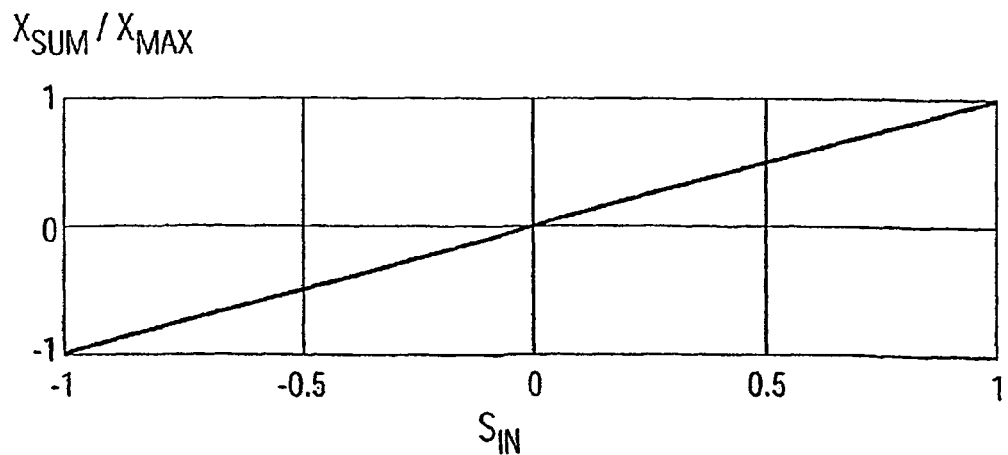

One example of this circuitry for production of an apparatus 8 which operates continuously and linearly with respect to $S_{IN}$ is shown in FIGS. 21, 22 and 23. This is based on the assumption that the reactance of the apparatus 8 is symmetrical, with positive values plotted on the abscissa representing inductive reactances, while negative abscissa values, in contrast, represent capacitive reactances. FIG. 21 shows the reactance of the capacitive unit 36 $X_{ASC}$ as a function of the output signal $S_{IN}$ from the matching unit 33. FIG. 22 shows the reactance of the inductive unit 35 $X_{TRIC}$ as a function of the output signal $S_{IN}$ of the matching unit 33. The resultant reactance $X_{SUM}$ of the apparatus 8, which comprises the total reactance of the series-connected inductive unit 35 and capacitive unit 36, is illustrated in FIG. 23 as a function of the output signal $S_{IN}$ from the matching unit 33. As can be seen, the relationship is linear.

Figure 24:
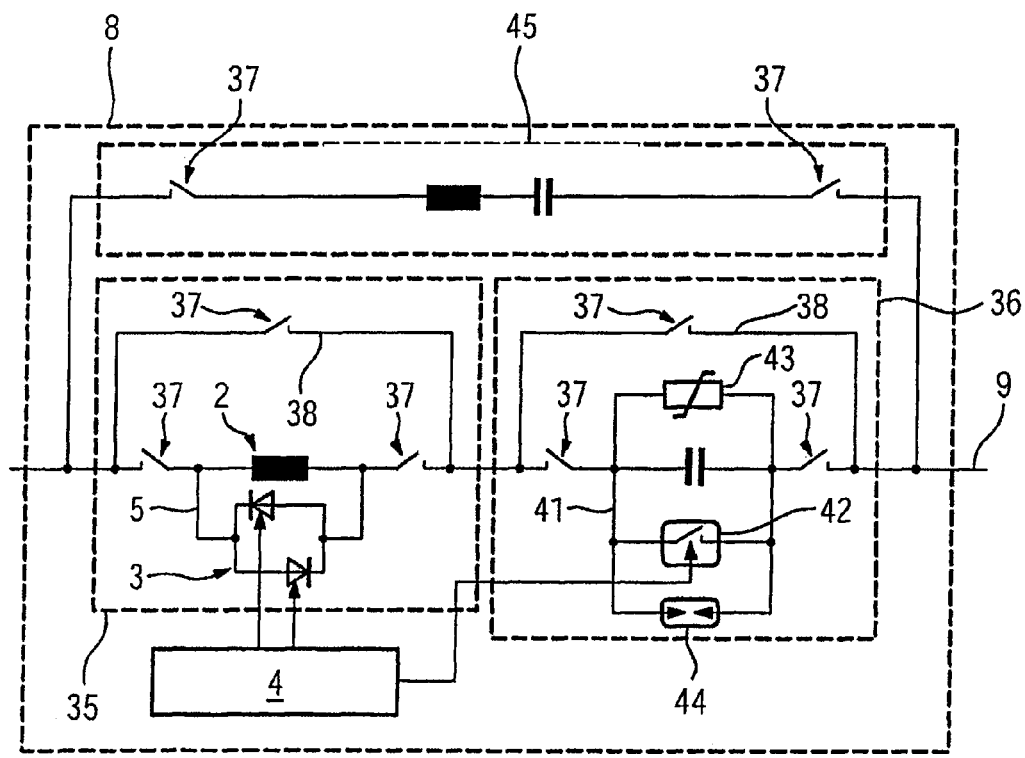
FIG. 24 shows a further exemplary embodiment of the apparatus according to the invention.

FIG. 24 shows a further exemplary embodiment of an apparatus 8 with an inductive unit 35 and a capacitive unit 36, which are connected in series, with a filter unit 45 being connected in parallel with this series circuit. The filter unit 45 represents a so-called single-tuned filter which is designed, for example, to trigger a specific harmonic frequency component of the voltage which is dropped across the apparatus 8.

Finally, it should be noted once again that a filter unit 45 can be connected in parallel with the apparatus 8 according to an embodiment only when a capacitive unit 36 is also provided, in addition to an inductive unit 35. In the case of one exemplary embodiment, which differs from this, an uncontrollable inductive unit, that is to say a coil, is provided instead of the capacitive unit 36, connected in series with the control coil 2, for this purpose, that is to say for connection of the filter unit 45.

The invention claimed is:

1. An apparatus for adjustment of the impedance of a high-voltage line which carries an alternating current and comprises a plurality of phases, having at least one control coil which can be inserted into the high-voltage line connected in series, and having at least one switching device which is in each case associated with one control coil, with a control unit being provided in order to control each switching device in such a manner that the effective reactance of the control coil in the apparatus can be adjusted by the switching of the switching device, wherein each switching device is arranged in parallel with that switching device's associated control coil, and wherein the control unit has a zero-crossing unit, which is connected to current sensors, in order to verify a zero crossing of the alternating current, and has at least one trigger unit which is connected to a trigger angle transmitter.

2. The apparatus according to claim 1, wherein at least one switching device comprises thyristors connected in opposite senses.

3. The apparatus according to claim 1, wherein the trigger angle transmitter is connected to a current sensor in order to measure the alternating current, and is connected to a voltage sensor in order to measure the voltage on the high-voltage line with respect to the ground potential or with respect to the voltages between the phases, with the control unit having a read only memory element which is provided for storage of control parameters, with at least one matching unit being provided in order to detect discrepancies between the control parameters and the measured values from the current sensor and/or the voltage sensor, or between the control parameters and measurement variables which are calculated from the measured values from the current sensor and/or voltage sensor.

4. The apparatus according to claim 1, wherein two control coils are provided, which are arranged in series, and wherein each control coil is arranged in parallel with that control coil's associated switching device.

5. The apparatus according to claim 4, wherein the control unit has two trigger units, which interact with a respective switching device.

6. The apparatus according to claim 4, wherein one of the switching devices has thyristors which are connected in opposite senses, with the other switching device being a mechanical switch.

7. The apparatus according to claim 1, comprising a capacitor which is connected in series with the control coil and can be bridged by means of a capacitor switching unit which is arranged in parallel with the capacitor in a capacitor parallel path.

8. The apparatus according to claim 7, wherein a coil is provided in the capacitor parallel path.

9. The apparatus according to claim 7, comprising a filter unit, which is arranged in parallel with a series path in which the control coil and the capacitor are connected in series.

10. A method for adjustment of the impedance of a high-voltage line which carries alternating current, the method comprising the step of:

bridging a control coil as a function of the phase of the alternating current by triggering a switching device which is arranged in parallel with the control coil which can be inserted in series into the high-voltage line, wherein the impedance of the high-voltage line being adjusted in this way.

11. A control unit for adjustment of the impedance of a high-voltage line which carries alternating current, comprising a zero-crossing sensor generating a zero-crossing signal on verification of a zero crossing of the alternating current, and at least one trigger unit, which is connected to a phase measurement device and to a trigger angle transmitter generating a trigger angle for the trigger unit, and which produces a trigger signal after a delay time corresponding to the trigger signal, on receiving a zero-crossing signal, which trigger signal is used to control the impedance of the high-voltage line by using a switching device to bridge a control coil, which is inserted in series into the high-voltage line.

* * * * *

UNITED STATES PATENT AND TRADEMARK OFFICE
CERTIFICATE OF CORRECTION

PATENT NO. : 7,768,241 B2
APPLICATION NO. : 10/595199
DATED : August 3, 2010
INVENTOR(S) : Willfried Breuer et al.

It is certified that error appears in the above-identified patent and that said Letters Patent is hereby corrected as shown below:

Title Page, insert

-- (30) Foreign Application Priority Data

Sep. 23, 2003 (DE)………...103 45 020.3 --.

Signed and Sealed this

Twelfth Day of October, 2010

David J. Kappos
*Director of the United States Patent and Trademark Office*